United States Patent
Rosal et al.

(10) Patent No.: US 9,352,425 B2
(45) Date of Patent: May 31, 2016

(54) MATERIAL SURFACE MODIFICATION USING FRICTION STIR WELDING HYBRID PROCESS

(71) Applicant: MegaStir Technologies LLC, Provo, UT (US)

(72) Inventors: David Rosal, West Bountiful, UT (US); Paul T. Higgins, Provo, UT (US); Russell J. Steel, Salem, UT (US); Scott M. Packer, Alpine, UT (US); Jeremy Peterson, Cedar Hills, UT (US); Steve W. Larsen, Payson, UT (US); Samuel C. Sanderson, Alpine, UT (US); Jonathan A. Babb, West Jordan, UT (US)

(73) Assignee: MegaStir Technologies LLC, Provo, UT (US)

( * ) Notice: Subject to any disclaimer, the term of this patent is extended or adjusted under 35 U.S.C. 154(b) by 0 days.

(21) Appl. No.: 14/571,055

(22) Filed: Dec. 15, 2014

(65) Prior Publication Data
US 2015/0097020 A1  Apr. 9, 2015

Related U.S. Application Data

(62) Division of application No. 13/623,710, filed on Sep. 20, 2012, now Pat. No. 8,910,851.

(60) Provisional application No. 61/536,959, filed on Sep. 20, 2011.

(51) Int. Cl.
*B23K 20/12* (2006.01)
*B23K 37/08* (2006.01)
*B23K 20/26* (2006.01)

(52) U.S. Cl.
CPC ............. *B23K 37/08* (2013.01); *B23K 20/1215* (2013.01); *B23K 20/1255* (2013.01); *B23K 20/26* (2013.01)

(58) Field of Classification Search
CPC . B23K 20/1255; B23K 20/122; B23K 20/125
See application file for complete search history.

(56) References Cited

U.S. PATENT DOCUMENTS 3,208,316 A  9/1965  Scribner
3,586,572 A  6/1971  Ericsson
(Continued)

FOREIGN PATENT DOCUMENTS

| CN | 201529847 | 7/2010 |
| JP | 2008221342 | 9/2008 |
| WO | WO2013/043914 | 3/2013 |

OTHER PUBLICATIONS

U.S. Appl. No. 13/623,710, Jul. 31, 2013, Office Action.
(Continued)

*Primary Examiner* — Erin Saad
(74) *Attorney, Agent, or Firm* — Workman Nydegger

(57) ABSTRACT

A system and method for modifying a work piece surface of high melting temperature materials such as Advanced High Strength Steels, wherein a friction stir welding tool may include cutting elements located on the outside diameter of a collar assembly, wherein the collar assembly may be retrofitted for existing friction stir welding tools, or may be designed as a custom attachment for a new hybrid friction stir welding tool, wherein the surface of the work piece may be modified by removing detrimental flash and burr created during operation of the friction stir welding tool.

20 Claims, 11 Drawing Sheets

(56) References Cited

U.S. PATENT DOCUMENTS

| | | | |
|---|---|---|---|
| 4,076,065 A * | 2/1978 | Somers | 152/210 |
| 5,794,835 A | 8/1998 | Colligan et al. | |
| 6,302,315 B1 * | 10/2001 | Thompson | 228/112.1 |
| 6,648,206 B2 | 11/2003 | Nelson et al. | |
| 8,241,556 B2 | 8/2012 | Rosal et al. | |
| 8,910,851 B2 | 12/2014 | Rosal et al. | |
| 2003/0205565 A1 | 11/2003 | Nelson et al. | |
| 2006/0043152 A1 | 3/2006 | Stol et al. | |
| 2006/0157531 A1 | 7/2006 | Packer et al. | |
| 2006/0169740 A1 | 8/2006 | Fukuhara et al. | |
| 2007/0102492 A1 | 5/2007 | Nelson et al. | |
| 2007/0157447 A1 | 7/2007 | Prevey | |
| 2008/0099533 A1 | 5/2008 | Hanlon | |
| 2009/0218033 A1 | 9/2009 | Aota et al. | |
| 2009/0236045 A1 | 9/2009 | Burton et al. | |

OTHER PUBLICATIONS

U.S. Appl. No. 13/623,710, Jan. 10, 2014, Office Action.
U.S. Appl. No. 13/623,710, Aug. 12, 2014, Notice of Allowance.

* cited by examiner

MATERIAL SURFACE MODIFICATION USING FRICTION STIR WELDING HYBRID PROCESS

CROSS-REFERENCE TO RELATED APPLICATIONS

This application is a divisional of U.S. patent application Ser. No. 13/623,710, filed Sep. 20, 2012, which claims the benefit of and priority to U.S. Provisional Patent Application No. 61/536,959, filed Sep. 20, 2011, the entireties of which are hereby incorporated by reference.

BACKGROUND OF THE INVENTION

1. Field Of the Invention

This invention relates generally to friction stir welding (FSW) and its variations including but not limited to friction stir processing (FSP), friction stir spot welding (FSSW), friction stir spot joining (FSSJ), friction bit joining (FBJ), friction stir fabrication (FSF) and friction stir mixing (FSM) (and hereinafter referred to collectively as "friction stir welding").

2. Description of Related Art

Friction stir welding is a technology that has been developed for welding metals and metal alloys. Friction stir welding is generally a solid state process. Solid state processing is defined herein as a temporary transformation into a plasticized state that typically does not include a liquid phase. However, it is noted that some embodiments allow one or more elements to pass through a liquid phase, and still obtain the benefits of the present invention.

The friction stir welding process often involves engaging the material of two adjoining work pieces on either side of a joint by a rotating stir pin. Force is exerted to urge the pin and the work pieces together and frictional heating caused by the interaction between the pin, shoulder and the work pieces results in plasticization of the material on either side of the joint. The pin and shoulder combination or "FSW tip" is traversed along the joint, plasticizing material as it advances, and the plasticized material left in the wake of the advancing FSW tip cools to form a weld. The FSW tip can also be a tool without a pin so that the shoulder is processing another material through FSP.

FIG. 1 is a perspective view of a tool being used for friction stir welding that is characterized by a generally cylindrical tool 10 having a shank 8, a shoulder 12 and a pin 14 extending outward from the shoulder. The pin 14 is rotated against a work piece 16 until sufficient heat is generated, at which point the pin of the tool is plunged into the plasticized work piece material.

Typically, the pin 14 is plunged into the work piece 16 until reaching the shoulder 12 which prevents further penetration into the work piece. The work piece 16 is often two sheets or plates of material that are butted together at a joint line 18. In this example, the pin 14 is plunged into the work piece 16 at the joint line 18.

Referring to FIG. 1, the frictional heat caused by rotational motion of the pin 14 against the work piece material 16 causes the work piece material to soften without reaching a melting point. The tool 10 is moved transversely along the joint line 18, thereby creating a weld as the plasticized material flows around the pin from a leading edge to a trailing edge along a tool path 20. The result is a solid phase bond at the joint line 18 along the tool path 20 that may be generally indistinguishable from the work piece material 16, in contrast to the welds produced when using conventional noon-FSW welding technologies.

It is observed that when the shoulder 12 contacts the surface of the work pieces, its rotation creates additional frictional heat that plasticizes a larger cylindrical column of material around the inserted pin 14. The shoulder 12 provides a forging force that contains the upward metal flow caused by the tool pin 14.

During friction stir welding, the area to be welded and the tool are moved relative to each other such that the tool traverses a desired length of the weld joint at a toolwork piece interface. The rotating friction stir welding tool 10 provides a continual hot working action, plasticizing metal within a narrow zone as it moves transversely along the base metal, while transporting metal from the leading edge of the pin 14 to its trailing edge. As the weld zone cools, there is typically no solidification as no liquid is created as the tool 10 passes. It is often the case, but not always, that the resulting weld is a defect-free, re-crystallized, fine grain microstructure formed in the area of the weld.

Travel speeds are typically 10 to 500 mm/min with rotation rates of 200 to 2000 rpm. Temperatures reached are usually close to, but below, solidus temperatures. Friction stir welding parameters are a function of a material's thermal properties, high temperature flow stress and penetration depth.

Previous patents have taught the benefits of being able to perform friction stir welding with materials that were previously considered to be functionally unweldable. Some of these materials are non-fusion weldable, or just difficult to weld at all. These materials include, for example, metal matrix composites, ferrous alloys such as steel and stainless steel and non-ferrous materials. Another class of materials that were also able to take advantage of friction stir welding is the superalloys. Superalloys can be materials having a higher melting temperature bronze or aluminum, and may have other elements mixed in as well. Some examples of superalloys are nickel, iron-nickel, and cobalt-based alloys generally used at temperatures above 1000 degrees F. Additional elements commonly found in superalloys include, but are not limited to, chromium, molybdenum, tungsten, aluminum, titanium, niobium, tantalum, and rhenium.

It is noted that titanium is also a desirable material to use for friction stir welding. Titanium is a non-ferrous material, but has a higher melting point than other nonferrous materials. The previous patents teach that a tool for friction stir welding of high temperature materials is made of a material or materials that have a higher melting temperature than the material being friction stir welded. In some embodiments, a superabrasive was used in the tool, sometimes as a coating.

Friction Stir Welding (FSW) has been in use now for almost 20 years as a solid state joining process. This process has evolved from being used on aluminum or low melting temperature materials to high melting temperature materials such as steel, stainless steel, nickel base alloys and others. Literature is replete with tool geometries and process parameters needed to have a repeatable process. An understanding of the FSW process is important to understanding the invention described below.

While FIG. 1 describes the general joining process, there is one particular problem that was not described. Once a friction stir weld or friction stir processing pass is complete, the starting point of the joint may be left with material flash caused by the initial tool plunge. In many applications, having material flash disposed on a work piece after FSW is unacceptable.

One method for removing material flash is a run-on tab. However, using a run-on tab may also lead to a requirement for additional fixturing, work piece material, and post process removal methods. Furthermore, in many cases, a run-on tab is not an option because of space limitations, work piece geometry, cost, etc.

An example of an application where a run-on tab may not be an option would be using FSW to repair certain cracks. For example, nuclear reactor containment vessels may not have the option for a run-on tab. Furthermore, the material flash that may be left over from the FSW plunge may create a new corrosion crack initiation site and cannot be tolerated for safety reasons. There are many other examples of how a resulting FSW surface with material flash (hereinafter "flash") may be detrimental to product performance, safety, and cost.

In some cases, flash resulting from the plunge is not the only detrimental effect resulting from FSW. Other problems from FSW may include unfavorable or detrimental residual stresses, tool undercut, flash along the weld due to tool wear or parameter selection, sharp flash locations creating safety concerns for human contact, inability to see sub-surface defects, fatigue life compromised by surface anomalies and others.

Having a consistent surface finish is preferred for engineered components in order to meet design and safety requirements. Thus, what is needed is a way to join Advanced High Strength Steels (AHSS) that can be used in the automotive and other industries.

BRIEF SUMMARY OF THE INVENTION

It is an object of the present invention to provide a system and method for modifying a work piece surface of high melting temperature materials such as Advanced High Strength Steels, wherein a friction stir welding tool may include cutting elements located on the outside diameter of a collar assembly, wherein the collar assembly may be retrofitted for existing friction stir welding tools, or may be designed as a custom attachment for a new hybrid friction stir welding tool, wherein the surface of the work piece may be modified by removing detrimental flash and burr created during operation of the friction stir welding tool.

These and other objects, features, advantages and alternative aspects of the present invention will become apparent to those skilled in the art from a consideration of the following detailed description taken in combination with the accompanying drawings.

DETAILED DESCRIPTION OF THE INVENTION

Figure 1:
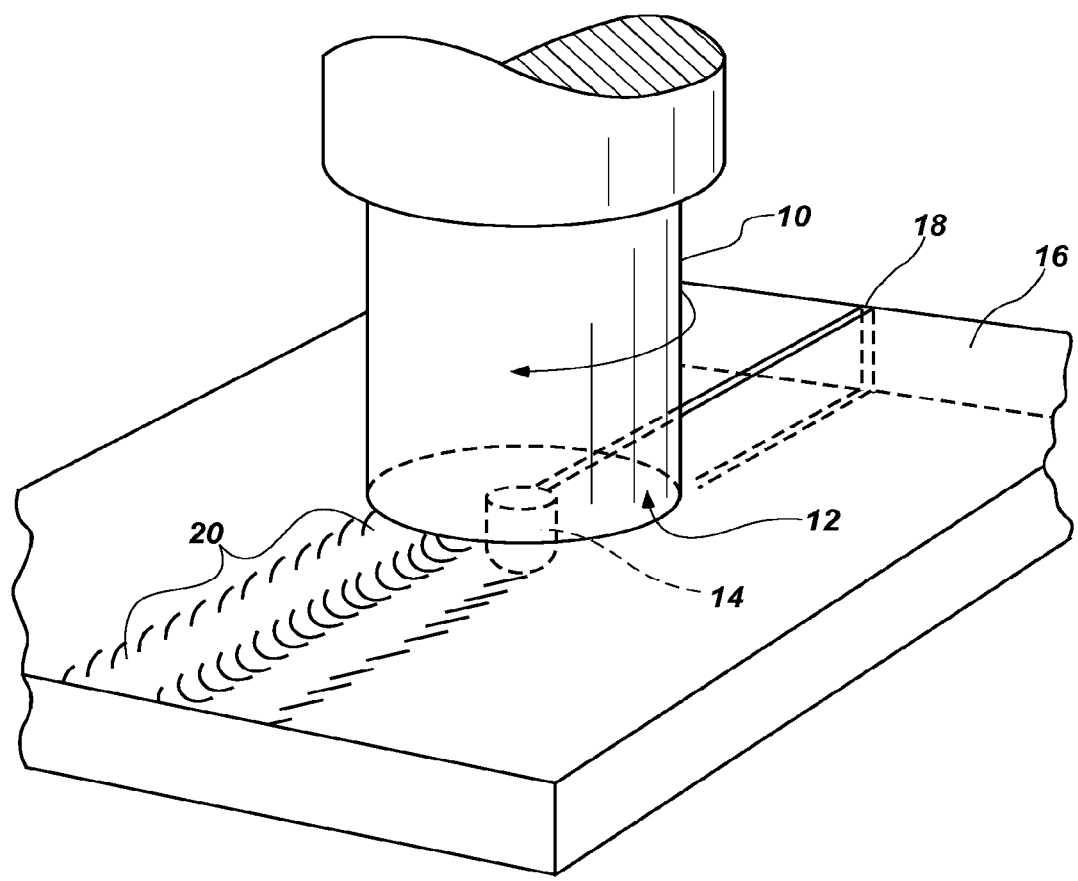
FIG. 1 is an illustration of the prior art showing friction stir welding of planar work pieces.

Reference will now be made to the drawings in which the various elements of the present invention will be given numerical designations and in which the invention will be discussed so as to enable one skilled in the art to make and use the invention. It is to be understood that the following description is only exemplary of the principles of the present invention, and should not be viewed as narrowing the claims which follow.

In a first embodiment shown in a perspective view in FIG. 2, the present invention shows a friction stir welding (hereinafter "FSW") tool 30 that may be designed to accommodate at least one cutting element 32 on the outside diameter or collar of the tool 30. Cutting elements 32 may be located on the outside diameter of the FSW tool 30 as shown.

In this embodiment, three cutting elements 32 are disposed on the outside diameter of the FSW tool 30. The cutting elements 32 are attached using a screw 34 as shown. Accordingly, the cutting elements 32 may be replaced if worn or broken.

The number of cutting elements 32 is not limited to three, and may be decreased to a single cutting element 32 or increased to as many as desired. The cutting elements 32 may be replaceable. The FSW tool 30 may be operated with or without the cutting elements 32. Accordingly, the cutting elements may or may not be a permanent fixture of the FSW tool 30.

The cutting elements 30 may be a single material with a cutting edge, or it may be reinforced using additional materials or layers.

Figure 2:
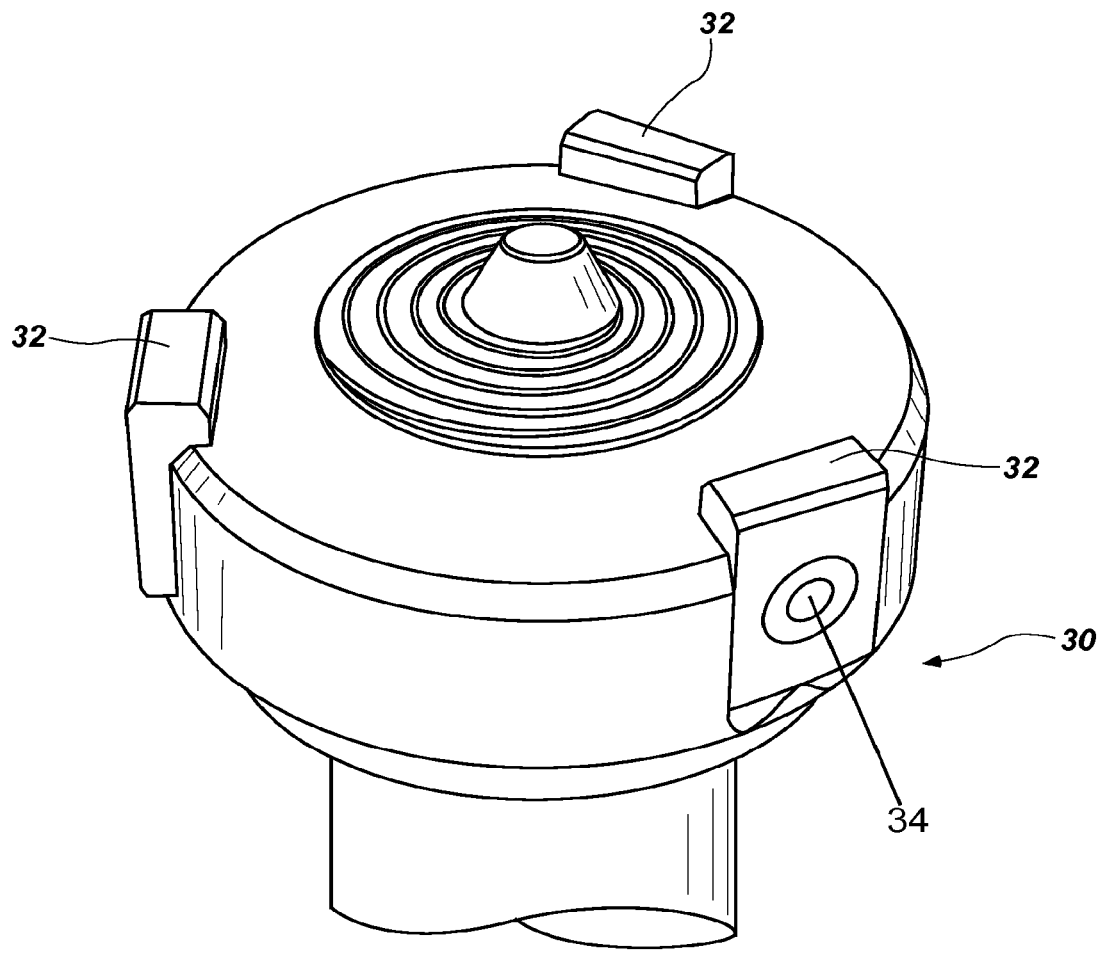
FIG. 2 is a perspective view of a friction stir welding tool that was designed to accommodate cutting elements on an outside diameter or collar of the tool.

Experimental results using the FSW tool 30 of FIG. 2 demonstrate that the cutting elements 32 are effective in removing the detrimental flash and burr created during the plunging of the FSW tool 30.

Figure 3:
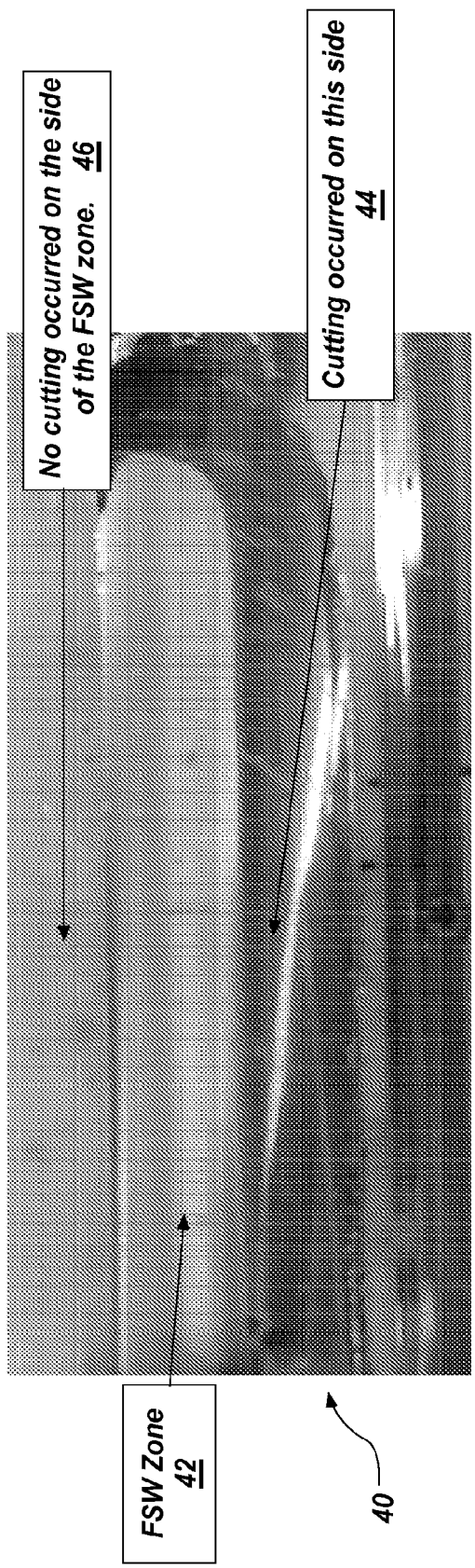
FIG. 3 is a close-up view of the results of trying to remove a burr using the friction stir welding tool of FIG. 2.

FIG. 3 is a top view of a work piece 40 that has been friction stir welded using the FSW tool 30 of FIG. 2. The work piece 40 shows the results of FSW in stainless steel using the FSW tool 30 shown in FIG. 2, with three cutting elements 32. High machine loads were required for this particular FSW geometry and an undesirable deflection of the FSW tool 30 created a natural tilt of a spindle (not shown) that was rotating the FSW tool. This tilt, resulting from a "C Frame" style FSW machine, caused the cutting elements 32 to cut only one side 44 of the processed FSW zone 42 as shown in FIG. 3. No cutting of the work piece 40 occurred on the opposite side 46.

Undesirable deflection of the FSW tool 40 would not be a problem if machine loads were low, machine deflection was negligible, or the tool geometry required lower loads. Accordingly, it was determined that the present invention needed further development to allow for FSW tool 30 deflection which is typical during some FSW processes.

Figure 4:
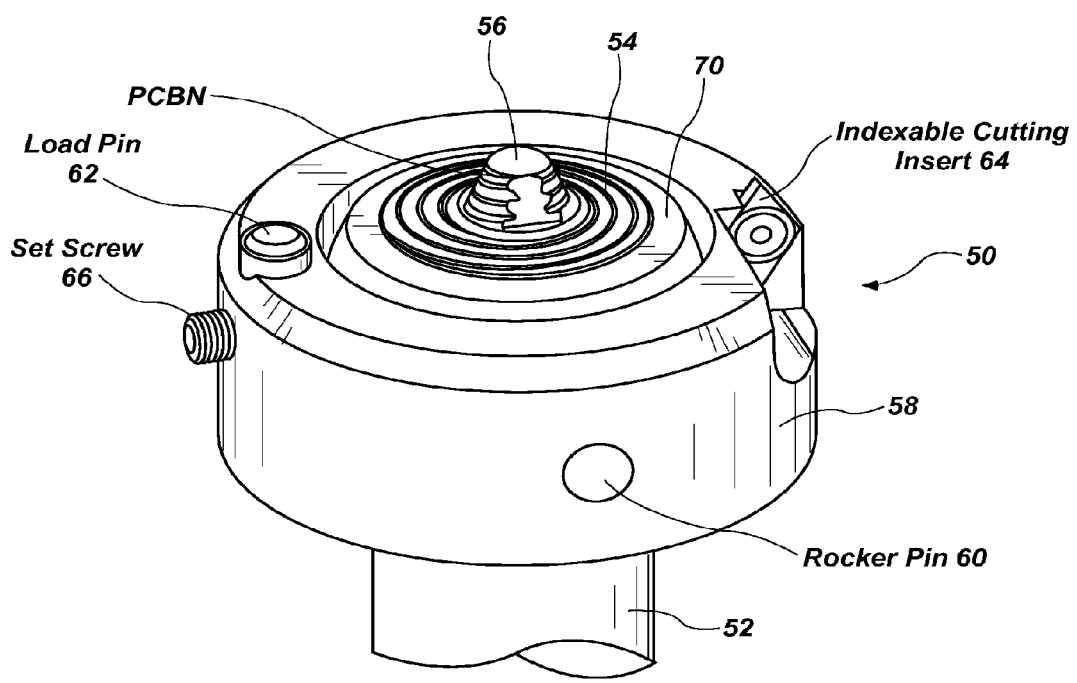
FIG. 4 is a perspective view of a floating outer collar for making a hybrid friction stir welding tool of the present invention.

FIG. 4 shows a second embodiment of the present invention using a "floating" collar design to create a hybrid FSW tool. The hybrid FSW tool or floating collar design is comprised of an FSW tool 50, an inner collar 70 and a floating outer collar 58, wherein the FSW tool 50 may include a shank 52, a shoulder 54 and a pin 56. The FSW tool 50 may or may not include the pin 56. The floating outer collar 58 is disposed around the inner collar 70 which is disposed around a top portion of the FSW tool 50.

The floating outer collar 58 may include two diametrically disposed rocker pins 60 that may give the floating outer collar 58 an additional degree of freedom, enabling the floating outer collar 58 to remain in a planer position with respect to the surface of work piece 40 being friction stir welded or processed, while the FSW tool 50 and the inner collar 70 may be deflected to some degree with respect to the work piece 40 while pivoting on the rocker pins 60.

In this second embodiment, a load pin 62 may remain in contact with a surface of the work piece 40 during FSW, which may offset the loads applied by a cutting insert 64. In the second embodiment, the three cutting elements 32 have been replaced by a single indexable cutting insert 64. The second embodiment may also include more than one indexable cutting insert 64 disposed on the floating outer collar 58.

It should be understood that the FSW tool 50 may have many different profiles and still include some surface modification tool on the floating outer collar 58. Accordingly, it is within the scope of the invention that the FSW tool may have a shoulder 54 having any profile that is known to those skilled in the art, including stepped, spiraled, concave, and convex or any other desirable profile. Regarding pins, there may be no pin on the shoulder, there may be a retractable pin or a standard pin. The pin may also have any pin profile that is desirable for the particular application of the FSW tool.

Figure 5:
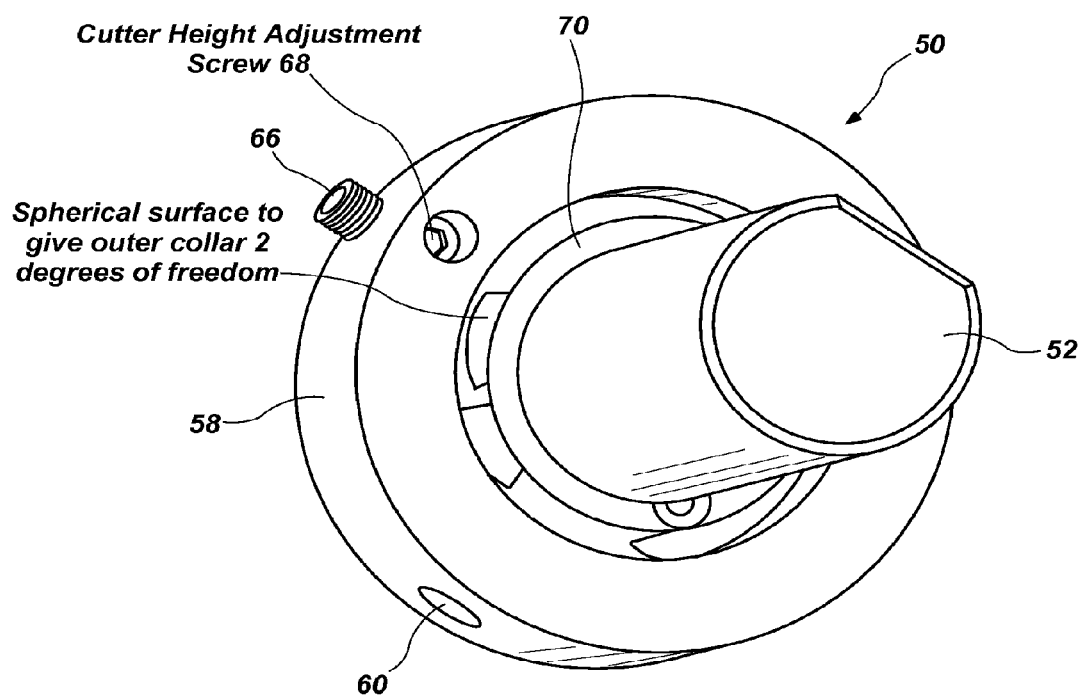
FIG. 5 is a perspective view of the underside of the hybrid friction stir welding tool showing a load pin adjustment used to set the height of a cutting insert.

FIG. 5 is a view of the underside of the floating outer collar 58 that may be disposed around the top portion of the FSW tool 50, and the inner collar 70. The height of the load pin 62 is adjusted using a cutting height adjustment screw 68 that is underneath the load pin 62. The cutting height adjustment screw 68 may be an integral part of the load pin or it may be separate. The height of the load pin 62 is adjusted prior to FSW. The load pin 62 is held in place using a set screw 66.

An outer surface of the inner collar 70 may be spherical to thereby enable continuous rocking or movement of the outer collar, about the rocker pins 60. This concept of enabling the FSW tool 50 and the inner collar 70 to be able to move with respect to the floating outer collar 58 in order to enable the floating outer collar to remain parallel to a surface of the work piece 40 enables the shank 52 of the FSW tool to be at a variable angle with respect to the surface of the work piece 40 at all times during FSW. In other words, the floating outer collar 58 remains substantially parallel to the surface of a work piece while the friction stir welding tool 50 and the inner collar 70 are free to move and operate at an angle that is not perpendicular to the surface of the work piece.

Figure 6:
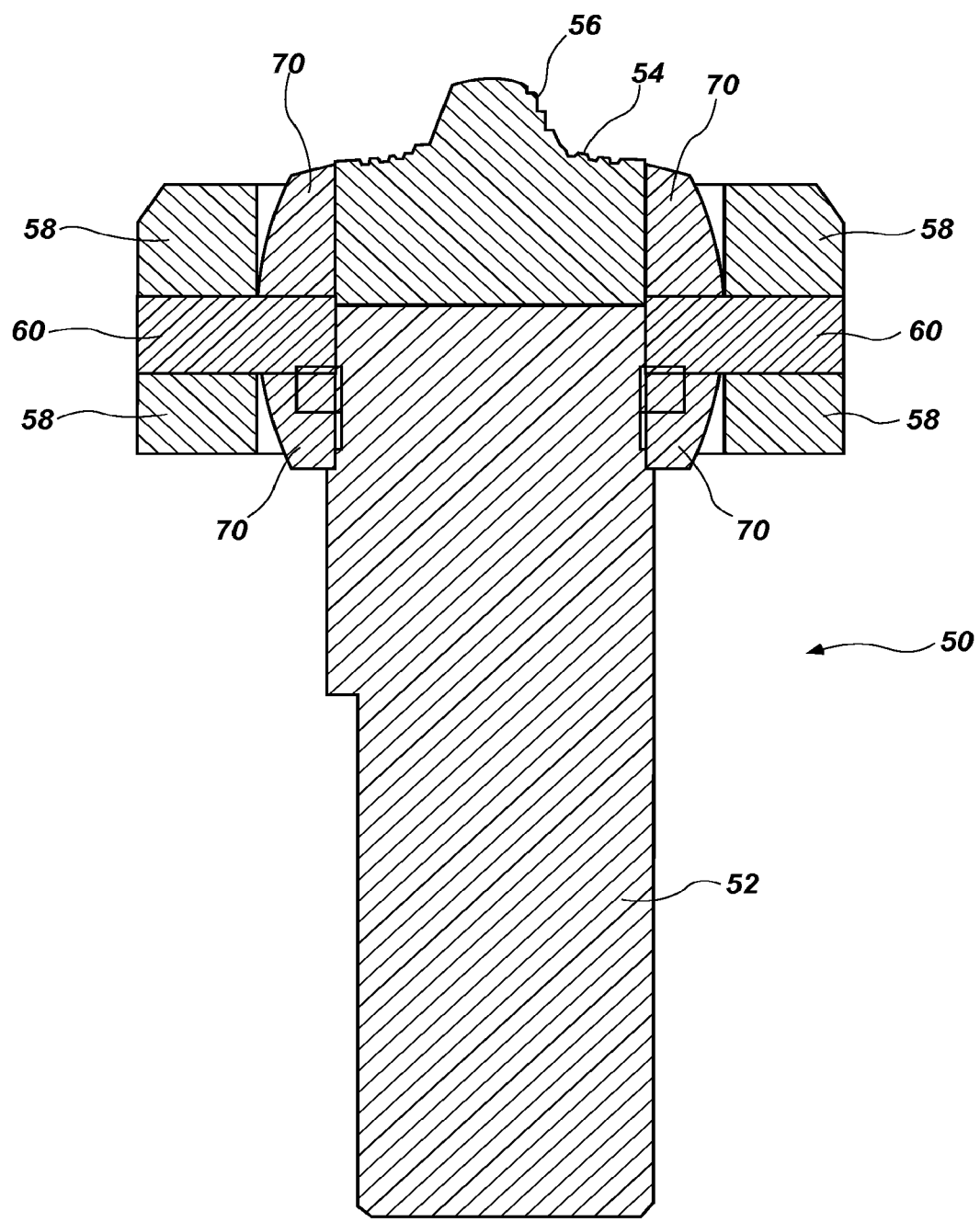
FIG. 6 is a cross sectional view of the hybrid friction stir welding tool described in FIGS. 4 and 5.

FIG. 6 is a cross-sectional view of the second embodiment of the present invention. FIG. 6 shows the FSW tool 50 comprised of the pin 56, the shoulder 54, and the shank 52, and two collars comprised of the inner collar 70 and the floating outer collar 58 including the rocker pins 60 (on opposite sides of the inner collar).

Figure 7:
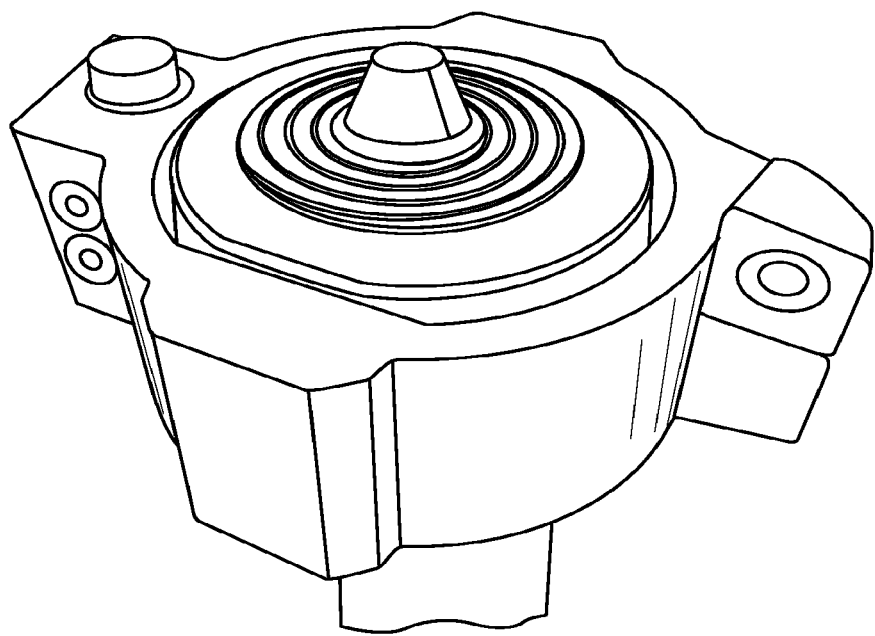
FIG. 7 is a perspective view of a hybrid friction stir welding tool for removing burrs and/or altering the surface of a work piece during friction stir welding.

FIG. 7 is a perspective view of an FSW tool 50, inner collar 70 and floating outer collar 58. The present invention therefore provides an FSW tool having a center geometry that performs FSW, along with an outer geometry that alters the surface of the work piece material being processed.

Figure 8:
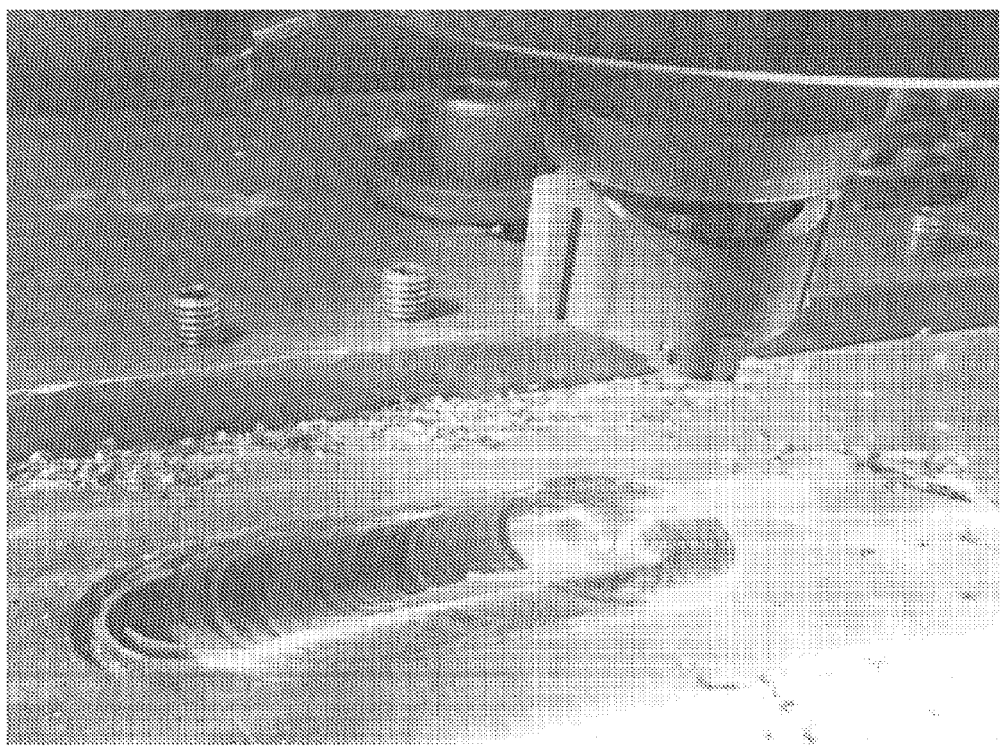
FIG. 8 shows a uniformly machined surface of a stainless steel work piece with a burr removed using a hybrid friction stir welding tool modified to incorporate the present invention.

FIG. 8 shows a uniformly machined surface of a stainless steel work piece 40. A burr was removed using the FSW tool 50, the inner collar 70 and the floating outer collar 58 of the present invention.

Figure 9:
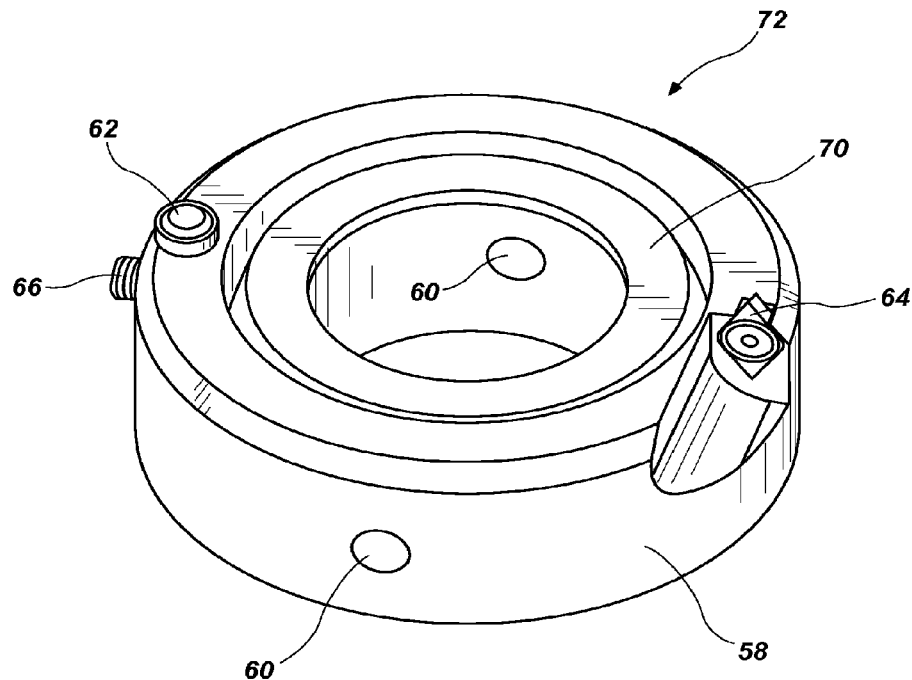
FIG. 9 is a perspective view of a collar assembly that may be used to retrofit an existing friction stir welding tool that already has a collar.

FIG. 9 is a perspective view of an inner collar 70 and the floating outer collar 58 in a third embodiment that can be coupled to an existing FSW tool (not shown) having a collar. Also shown are the rocker pins 60 on opposite sides of the collars 58, 70, as well as the set screw 66 the load pin 62 and the indexable cutting insert 64. This collar assembly 72 can be coupled to an existing FSW tool as a retrofit in order to take advantage of the principles of the present invention.

Figure 10:
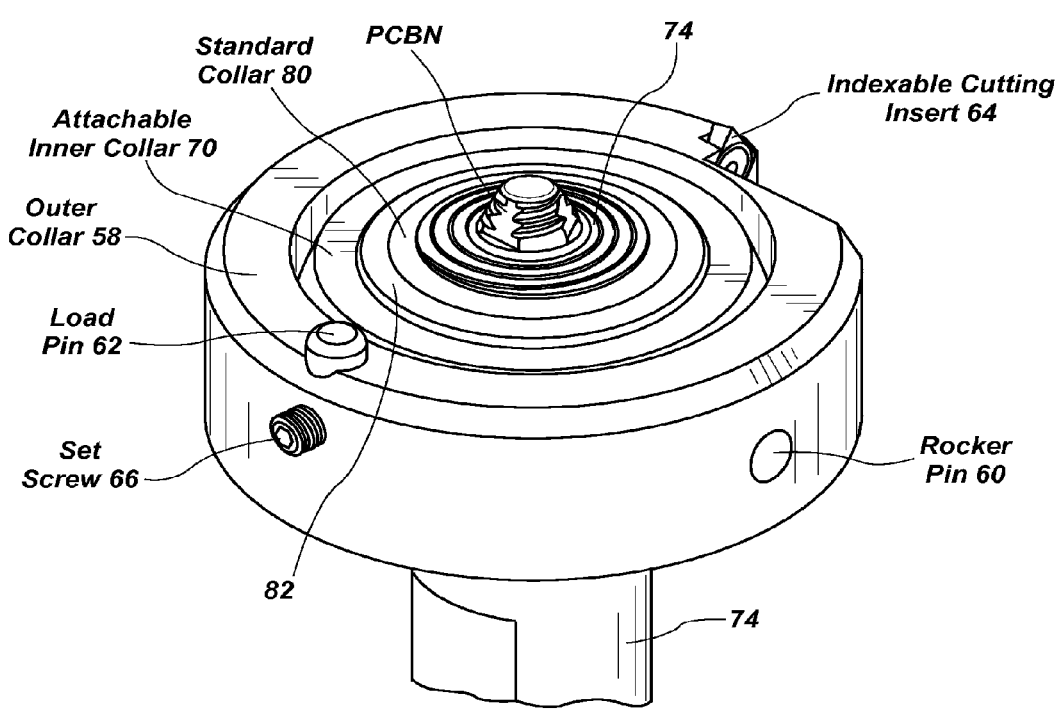
FIG. 10 is a hybrid friction stir welding tool that is a combination of the collar assembly of FIG. 9 and a friction stir welding tool that has a collar.

FIG. 10 is a perspective view of the collar assembly 72 of FIG. 9 that is now coupled to an existing FSW tool 74. The FSW tool 74 has its own standard collar 80, but is now adapted to be coupled to the collar assembly 72. An adapter collar 82 is coupled to the standard collar 80 using a method that is known to those skilled in the art. The adapter collar 82 may include a lip lock 84 on which the inner collar 70 can rest.

It should be understood that any appropriate means can also be used for attaching the collar assembly 72 to the FSW tool 74.

Figure 11:
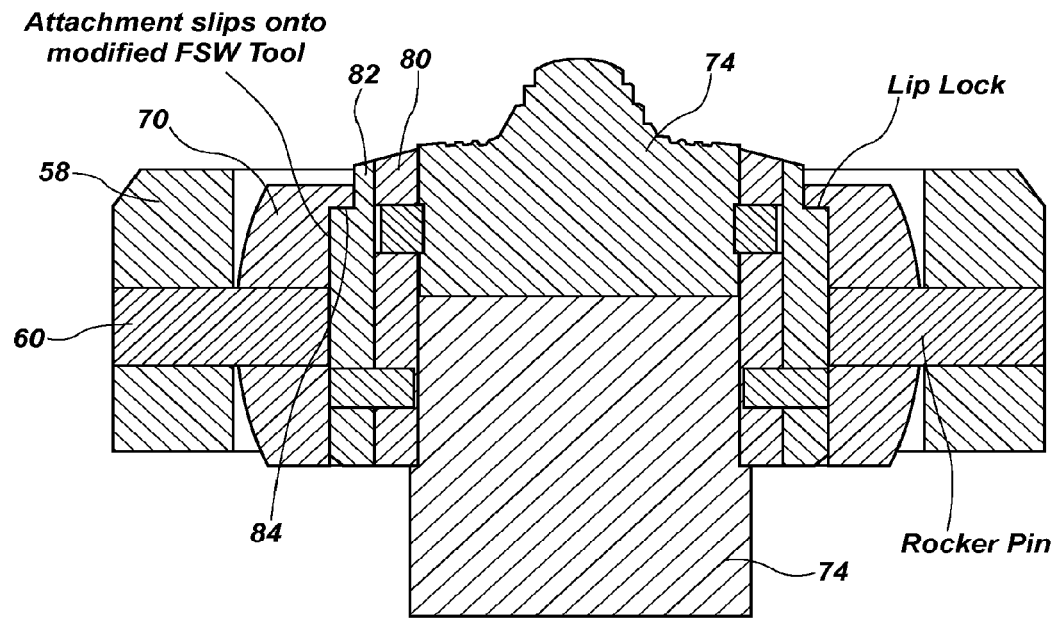
FIG. 11 is a cross sectional view of the retrofitted friction stir welding tool of FIG. 10.

FIG. 11 is a cross-sectional view of the embodiment of FIG. 10, showing retaining lip lock 84 to maintain cutter location during FSW.

FIGS. 2-11 above illustrate the concept of creating a hybrid FSW tool that not only friction stir welds or processes a given work piece, but also machines the surface of the work piece at the same time in order to create the desired surface finish.

The present invention can be further modified by attaching other surface modification tools to the floating outer collar 58 to alter the surface of the work piece according to the designer's design parameters. In other words, in place of the indexable cutting insert 64, a different tool may be attached to the floating outer collar 58.

Figure 12:
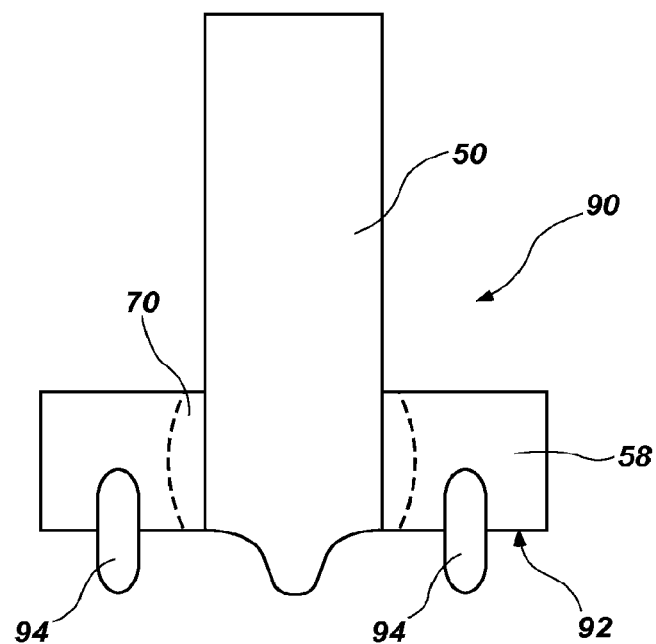
FIG. 12 is a profile view of a hybrid friction stir welding tool including a peening surface modification tool.

FIG. 12 is a profile view of another hybrid friction stir welding tool 90 of the present invention. In this simplified diagram, an FSW tool 50 has an inner collar 70 and a floating outer collar 58. FIG. 12 is being shown to illustrate a surface modification tool other than an indexable cutting insert 64. However, instead of being placed in the same location as the insert, the surface modification tool is disposed in a surface 92 of the floating outer collar 58. In this figure, at least one elongated ball 94 is disposed in the surface 92. The ball 94 may be held rigidly in the surface 92, or it may be free to rotate. The ball 94 is provided for peening or burnishing of the work piece. A plurality of balls 94 may also be disposed in the surface 92. The balls 94 may be elongated or round.

Figure 13:
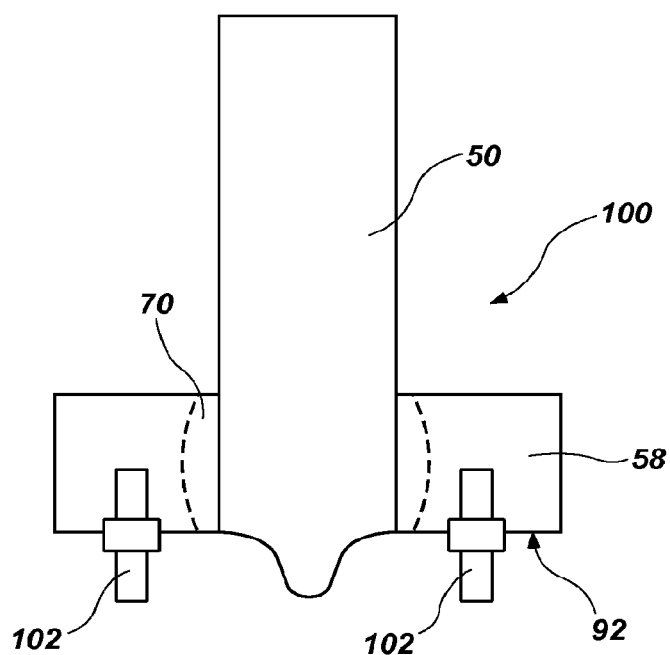
FIG. 13 is a profile view of a hybrid friction stir welding tool including a grinding surface modification tool.

FIG. 13 is a profile view of another hybrid friction stir welding tool 100 of the present invention. In this simplified diagram, an FSW tool 50 has an inner collar 70 and a floating outer collar 58. FIG. 13 is being shown to illustrate a surface modification tool other than an indexable cutting insert 64. However, instead of being placed in the same location as the insert, the surface modification tool is disposed in the surface 92 of the floating outer collar 58. In this example, at least one wheel 102 is shown disposed in the surface of the floating outer collar 58. The wheel 102 may be a grinding wheel. The wheel 102 may be replaceable in order to use a wheel having different profiles or materials on the wheel, such as a grit for a grinding wheel. The wheel 102 may use bearings or a pin to enable rotation of the wheel.

Possible surface modification tools include but should not be considered to be limited to a rolling ball that may or may not be located where the indexable cutting insert 64 is now located, the rolling ball being used to create a shot peened surface to create residual compressive stresses, and thereby increasing fatigue life of the work piece. In another embodiment, a stationary ball or ball-like geometry may also be mounted in order to burnish the work piece surface to improve surface finish, reduce corrosion potential and/or improve fatigue properties. In another alternative embodiment, a mirror may also be mounted to provide a reflective surface so that continuous laser processing of the work piece surface may be achieved to alter or reduce surface residual stresses, or laser process the surface of the friction stir processed zone. For materials that harden during the friction stir process, in another alternative embodiment, a grinding fixture may be used to alter the work piece surface as well.

The FSW tools described above will have at least one cutting element or other surface modifying tool, but may contain more. The FSW tool may have at least one grinding element or feature, at least one burnishing element or feature, at least one peening element or feature, at least one reflective element or feature for laser transmission. In an alternative embodiment, the FSW tool may have more than one feature on a floating outer collar 58.

The FSW tool may have a rotational speed between 10 and 40200 RPM, and can apply loads between 50 lbf and 60,000 lbf along an FSW tool axis. The FSW tool may use an alternate heating source around the FSW tool using inductive, resistive, IR, or other methods known to the FSW industry. The heating source will affect the characteristics of the resulting weld formed by FSW.

In another alternative embodiment, the FSW tool may use an alternate cooling source around the FSW tool to thereby affect the operating characteristics of the FSW tool. In another alternative embodiment, the FSW tool may have a detachable/modular surface modification tool, or an integrated surface modification tool. The FSW tool may contain any of the metals outlined in the periodic table. The FSW tool may be operated when surrounded by a liquid or fluid, and be used with a shielding gas or operated in air.

The FSW tool may be used to process those materials found in columns 1A through 7A on the Periodic Table and all transition elements and combinations of these elements.

The FSW tool may be modular, or in other words, it may have replaceable components and features that can be attached for modifying a work piece surface. The FSW tool may be used in conjunction with a surface modification tool used on a separate spindle or device. The FSW tool may have a retractable pin, or be used with a bobbin tool design. The FSW tool may also have a shoulder and pin that are controlled independently of the surface modification tool. The FSW tool may operate wherein the surface modification tool operates at different speeds from the friction stirring tool element. The FSW tool may also be operated in a temperature control mode.

The surface modification tool that may be coupled to the FSW tool may be any consumable.

The FSW tool may be operated as a spot welding tool with no translation motion.

The FSW tool may have a friction element that is consumable (i.e. friction hydropillar).

The FSW tool may be operated wherein no friction element serves as a clamping device. The FSW tool may be used on a non-planer surface.

The work pieces may have another material or greater material thickness than the parent material to allow for stock removal or modification if needed.

Without departing from the scope of this invention, in another alternative embodiment, one or more other spindles may be attached to a machine that is holding and rotating a first FSW tool. It may be possible to allow the FSW process to occur during a same pass, while allowing for different surface speeds to be achieved by using the different spindle heads. Thus, the second spindle head may be movable relative to the position of the first spindle head in order to perform FSW at some location near to the first spindle head. But not always in the same location relative to the first spindle head.

It is to be understood that the above-described arrangements are only illustrative of the application of the principles of the present invention. Numerous modifications and alternative arrangements may be devised by those skilled in the art without departing from the spirit and scope of the present invention. The appended claims are intended to cover such modifications and arrangements.

What is claimed is:

1. A system for removing surface features on a work piece during friction stir welding, the system comprising:
   a friction stir welding tool having a shank, a shoulder, and an inner collar disposed around the shoulder near a working end of the friction stir welding tool, the friction stir welding tool being configured to rotate about a longitudinal axis extending therethrough;
   a floating outer collar rotationally fixed about the longitudinal axis relative to the inner collar and movably coupled to the inner collar about a lateral rotational axis, the lateral rotational axis being transverse to the longitudinal axis; and
   at least one insert connected to a surface of the floating outer collar.

2. The system of claim 1, the lateral rotational axis being perpendicular to the longitudinal axis.

3. The system of claim 1, the floating outer collar being movably coupled to the inner collar by one or more rocker pins positioned radially through the floating outer collar and the inner collar, the one or more rocker pins defining the lateral rotational axis.

4. The system of claim 1, the at least one insert being a cutting insert.

5. The system of claim 1, the at least one insert being a surface modifying tool, wherein the surface modifying tool is a grinding element, a burnishing element, a peening element, or a reflective element.

6. The system of claim 1, a position of the at least one insert being adjustable relative to the surface of the floating outer collar.

7. The system of claim 1, further comprising at least one load pin connected to the surface of the floating outer collar and configured to offset a torque applied to the floating outer collar by the at least one insert when in contact with the work piece.

8. The system of claim 7, a position of the at least one load pin being adjustable relative to the surface of the floating outer collar.

9. The system of claim 1, the at least one insert comprising a plurality of cutting inserts.

10. A system for removing surface features on a work piece during friction stir welding, the system comprising:
   a friction stir welding tool having a shank, a shoulder, and an inner collar disposed around the shoulder near a working end of the friction stir welding tool, the friction stir welding tool being configured to rotate about a longitudinal axis extending therethrough;
   a floating outer collar located circumferentially about the inner collar and rotationally fixed about the longitudinal axis relative to the inner collar, the floating outer collar being movably coupled to the inner collar about a lateral axis of rotation through the inner collar, the lateral axis of rotation being transverse to the longitudinal axis; and at least one insert disposed on the floating outer collar.

11. The system of claim 10, the friction stir welding tool further comprising an adapter collar positioned between the inner collar and the shoulder.

12. The system of claim 10, the at least one insert comprising a cutting insert and a surface modifying tool, the cutting insert and surface modifying tool being each configured to offset torque applied to the floating outer collar by the other.

13. The system of claim 10 further comprising a cooling element in thermal communication with the friction stir welding tool.

14. The system of claim 10 further comprising a heating element configured to apply thermal energy to the work piece.

15. The system of claim 10, the floating outer collar being coupled to the inner collar by one or more rotatable pins, the rotatable pins being configured to transmit up to 60,000 pound-feet of torque to the at least one insert.

16. The system of claim 10, the at least one insert being rotatable relative to a surface of the floating outer collar.

17. A system for removing surface features on a work piece during friction stir welding, the system comprising:

a friction stir welding tool having a shank, a shoulder, an axis of rotation, and an inner collar disposed around the shoulder near a working end of the tool;

a floating outer collar movably coupled to the inner collar by one or more rocker pins inserted through the floating inner collar and at least partially through the inner collar, the floating outer collar having a working surface in the direction of the working end of the friction stir welding tool; and at least one cutting insert disposed on the floating outer collar, at least part of the cutting insert extending a cutting distance beyond the working surface in the direction of the working end of the friction stir welding tool.

18. The system of claim 17 further comprising a second insert disposed on the floating outer collar, the at least one cutting insert being disposed a first radius from the axis of rotation and the second insert being disposed a second radius from the axis of rotation.

19. The system of claim 18, the first radius and the second radius being different.

20. The system of claim 17, the at least one cutting insert being adjustable to alter the cutting distance.

* * * * *